US008875382B2

(12) United States Patent
Glueck

(10) Patent No.: US 8,875,382 B2
(45) Date of Patent: Nov. 4, 2014

(54) METHOD OF ASSEMBLING SUPERCONDUCTOR BEARING

(75) Inventor: Stefan Glueck, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 231 days.

(21) Appl. No.: 13/502,645

(22) PCT Filed: Oct. 15, 2010

(86) PCT No.: PCT/EP2010/065501
§ 371 (c)(1),
(2), (4) Date: Jul. 17, 2012

(87) PCT Pub. No.: WO2011/048019
PCT Pub. Date: Apr. 28, 2011

(65) Prior Publication Data

US 2012/0272513 A1 Nov. 1, 2012

(30) Foreign Application Priority Data

Oct. 20, 2009 (DE) ........................ 10 2009 049 889

(51) Int. Cl.
*F16C 32/04* (2006.01)
*F16C 43/00* (2006.01)

(52) U.S. Cl.
CPC ............. *F16C 32/0438* (2013.01); *F16C 43/00* (2013.01)
USPC .......................... 29/599; 29/898.04; 310/90.5

(58) Field of Classification Search
CPC ............. F16C 32/0438; F16C 32/0406; F16C 32/0408; F16C 32/0425; F16C 32/0436
USPC ............................... 29/599, 898.04; 310/90.5
See application file for complete search history.

(56) References Cited

U.S. PATENT DOCUMENTS 5,256,638 A * 10/1993 Weinberger et al. .......... 505/166
5,330,967 A * 7/1994 Takahata et al. .............. 505/166
5,517,071 A * 5/1996 Moon .......................... 310/90.5
6,369,476 B1 4/2002 Sung et al.

FOREIGN PATENT DOCUMENTS

DE 10358341 A1 7/2005
JP 5026296 A 2/1993
JP 7293564 A 11/1995
JP 7312885 A 11/1995
JP 07312885 A * 11/1995
WO 2010094263 A2 8/2010

OTHER PUBLICATIONS

Machine translation of JP7312885A, obtained Mar. 20, 2014.*
JP07312885A Machine Translation (Second), obtained May 28, 2014.*

* cited by examiner

*Primary Examiner* — Livius R Cazan
(74) *Attorney, Agent, or Firm* — Simpson & Simpson, PLLC

(57) ABSTRACT

A method for assembling a superconducting bearing, wherein the superconducting bearing has a first bearing ring including a first body made of a type-2 superconducting material and a second bearing ring including a second body made of a type-2 superconducting material, the method including the following steps: assembling the first bearing ring and the second bearing ring; and, applying an external magnetic field, which permeates both bodies to the first body and to the second body.

4 Claims, 3 Drawing Sheets

9
1
2
3
4
7
5
9
8
1
3
2
4
5
7

METHOD OF ASSEMBLING SUPERCONDUCTOR BEARING

CROSS-REFERENCE TO RELATED APPLICATIONS

The present application is the U.S. national stage application pursuant to 35 U.S.C. §371 of International Patent Application No. PCT/EP2010/065501, filed Oct. 15, 2010, which claims priority from German Patent Application No. 10 2009 049 889.3, filed Oct. 20, 2009, which applications are incorporated herein by reference in their entireties.

FIELD OF THE INVENTION

The invention broadly relates to a method for assembling a superconducting bearing. and to a superconducting bearing assembled according to that method.

BACKGROUND OF THE INVENTION

There are known superconducting bearings that have a second bearing ring to which a second body made of a type-2 superconducting material is attached. Flux tubes, so-called vortices, with a superconducting current flowing around them, develop in the type-2 superconducting material of the second body in the presence of a magnetic field. The vortices can be displaced in relation to this exciting magnetic field only against a mechanical resistance, so that the magnetic field together with the type-2 superconducting material of the second body forms a self-adjusting bearing on the second bearing ring.

It is known from practice that a magnetic field which excites flux tubes is supplied by permanent magnets, by normally conducting coils or by superconducting coils arranged on a first bearing ring of the bearing. One disadvantage is that both the coils and the permanent magnets are able to supply magnetic fields of only a small size, for example in comparison with the critical magnetic field of the material of the type-2 superconductor of the second body beneath the type-2 superconductor of the second body at temperatures below the transition temperature. The high restoring forces and/or holding forces of the superconducting bearing, which are possible in principle, are achieved only partially because of the comparatively low magnetic field.

German Patent Application No. 10 2009 009 126.2, filed on Feb. 17, 2009, describes a superconducting bearing, which includes a first body on a first bearing ring and a second bearing ring with a second body, such that the two bodies are made of type-2 superconducting material, and an external magnetic field is permanently applied to the first body at the first bearing ring, such that the second body is assembled on the second bearing ring in such a way that the magnetic field applied to the first body extends at least partially into the area of the second body. The distribution of the flux tubes in the second body is determined by the magnetic field applied to the first body, the structure of which may in turn be adjusted by an external magnetic field. With regard to performing the assembly of the superconducting bearing, it is provided that first the outer magnetic field is applied to the first body at the first bearing ring and then the two bearing rings are assembled, so that the magnetic field applied to the first body at least partially permeates the second body. Since the first bearing ring has the first body with the applied magnetic field, when the second bearing ring is assembled, the assembly of the bearing may prove to be complex on the whole. Since a superconductor does not receive the external magnetic field completely, but instead it does so with only minor flux density losses, the flux density losses may be added up in assembly because the flux density losses occur twice in performing this method, namely in magnetization through the external magnetic field and then in magnetization of the second body in the magnetic field of the first body. The bearing assembled by this method then has a magnetic field volume density lower than that theoretically possible, thus, also reducing the holding forces and the stiffness of the assembled bearing.

BRIEF SUMMARY OF THE INVENTION

The object of the present invention is to provide a simple method for the assembly of a superconducting bearing, which will permit a high volume density of the magnetic field in the assembled bearing.

In the method step of assembling the two bearing rings before applying the magnetic field, the two bearing rings can be handled more easily and assembly can be performed at room temperature, for example with magnetic field-free bearing rings.

The additional method step of simultaneously applying an external magnetic field, which permeates both bodies to the first body and to the second body reducing the flux density losses, can occur only once because the external magnetic field is applied only once and is applied to both bodies at the same time.

In a preferred implementation of the method, it is provided that the external magnetic field is supplied by a magnetizing device. In a preferred embodiment of the method, the magnetizing device comprises a coil. The magnetizing device permits an implementation of the method step of applying the external magnetic field supplied by the magnetizing device to both bodies, such that this implementation is coordinated with the magnetic field to be applied. The external magnetic field can be supplied by a direct current in the coil or, as an alternative, it may be supplied by a pulsed current in the coil. The external magnetic field may be applied as long as at least one of the two bodies has not yet been converted to the superconducting state or supplied by activating the current in the coil, whereas one or both bodies are already in the superconducting state. It is self-evident that the method step of simultaneously applying the external magnetic field to both bodies can also be performed in two or more sub-steps, wherein the magnetic field already applied previously is modified by an additional external magnetic field.

In a preferred implementation of the method, it is provided that the magnetizing device, for example the coil, is inserted through a hollow shaft arranged in the bearing, for example in one of the two bearing rings. The external magnetic field of the magnetizing device then passes through the body of the hollow shaft into the intermediate space between the two bearing rings, where the two bodies made of the type-2 superconducting material are arranged.

In an alternative or supplementary preferred implementation of the method, it is preferably provided that the magnetizing device, for example the coil, is inserted between the bearing rings. This yields the advantage that the magnetizing device, specifically the coil, may be accommodated in physical proximity to the two bodies, so that a magnetic field with a high volume density can be applied to each of the bodies, and interfering influences, for example, due to the material, which is often paramagnetic, of the shaft of the bearing and/or of the bearing rings can be suppressed.

In an alternative to the two options mentioned above or a supplementary preferred implementation of the method, it is provided that the magnetizing device, for example the coil, is arranged to surround both bearing rings.

Additional advantages and features of the invention are derived from the dependent claims as well as the description of preferred exemplary embodiments.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
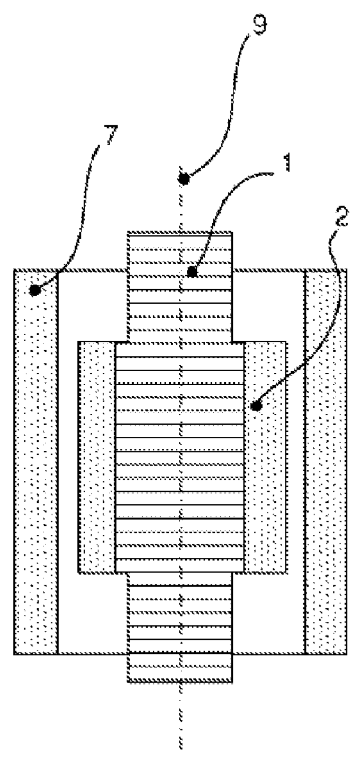
FIG. 1 shows a schematic cross-sectional view of a first step of a preferred implementation of the method of the invention in the assembly of a preferred exemplary embodiment of a present invention bearing.

FIG. 1 shows first bearing ring 1 of a superconducting bearing with first body 2 made of a type-2 superconductor fixedly secured to an external lateral surface of first bearing ring 1. The superconducting bearing further includes a second bearing ring (not shown FIG. 1) to whose internal lateral surface second body 7 made of a type-2 superconductor is attached. The material of the type-2 superconductor is identical for both bodies 2, 7. However, it is self-evident that first body 2 may be made of a material different from the material of second body 7.

The two bearing rings are assembled in a first step in the implementation of the method for assembly of the superconducting bearing with first bearing ring 1 and first body 2 as well as the second bearing ring with second body 7. Bodies 2, 7 are in the normally conducting state, so that assembly of the two bearing rings is performed at room temperature.

First bearing ring 1 may be assembled with a radial offset, based on an axis of rotation 9 of the bearing, and it may be held in this offset position by means of an auxiliary device in implementing the assembly until the bearing has achieved an adequate holding force and the auxiliary device is removed, so that first bearing ring 1 enters the intended position, in which the axis of symmetry of first bearing ring 1 is aligned with axis of rotation 9. It is self-evident that in performing the assembly of the two bearing rings, first bearing ring 1 may also be arranged and held in the auxiliary device in such a way that it forms an angle with axis of rotation 9.

Figure 2:
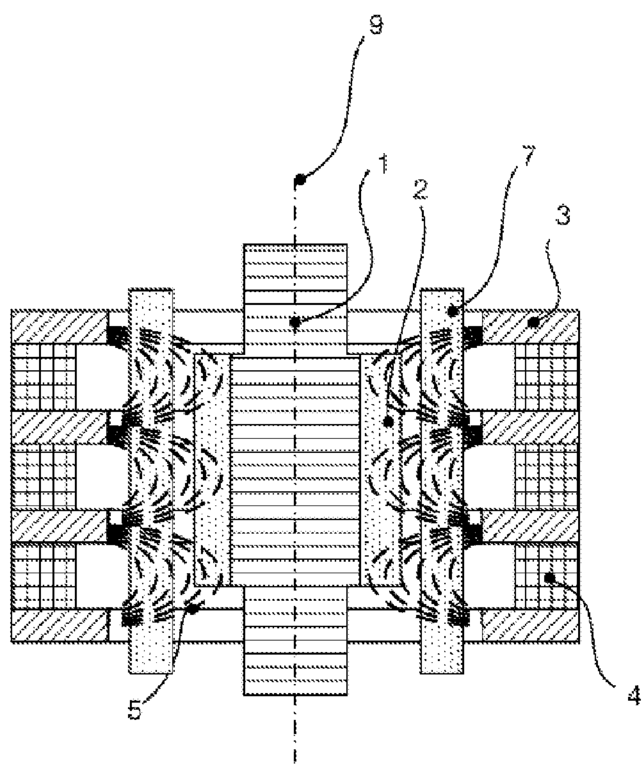
FIG. 2 shows a cross-sectional view of the bearing illustrated in FIG. 1 in performing a second step of the method.

FIG. 2 shows the second step of the method for assembling the bearing, namely simultaneously applying external magnetic field 5 permeating both bodies 2, 7 to first body 2 and to second body 7, such that external magnetic field 5 is supplied by a magnetizing device, which includes coil 4.

The coil magnetic field supplied by energized coil 4, is guided over flux-conducting components 3 and is directed as external magnetic field 5 toward the assembled bearing rings, so that two bodies 2, 7 may be permeated by external magnetic field 5 at the same time. In a later sub-step, bodies 2, 7 are cooled, i.e., cooled below the transition temperature of the respective type-2 superconductor, so that external magnetic field 5 is applied to respective body 2, 7.

In a concluding method step, the magnetizing device is removed along with coil 4 and flux-conducting components 3, but bodies 2, 7 are left in the superconducting state, so that superconducting currents flow around the flux lines of the applied magnetic field in bodies 2, 7 and trace an image of external magnetic field 5, which was previously present at the same location in respective body 2, 7 and is present as applied magnetic field 6 in some sections between two bodies 2, 7 and is responsible for the holding forces and the stiffness of the bearing. The course of the field lines of applied magnetic field 6 essentially traces the course of the field lines of external magnetic field 5 applied previously.

Figure 3:
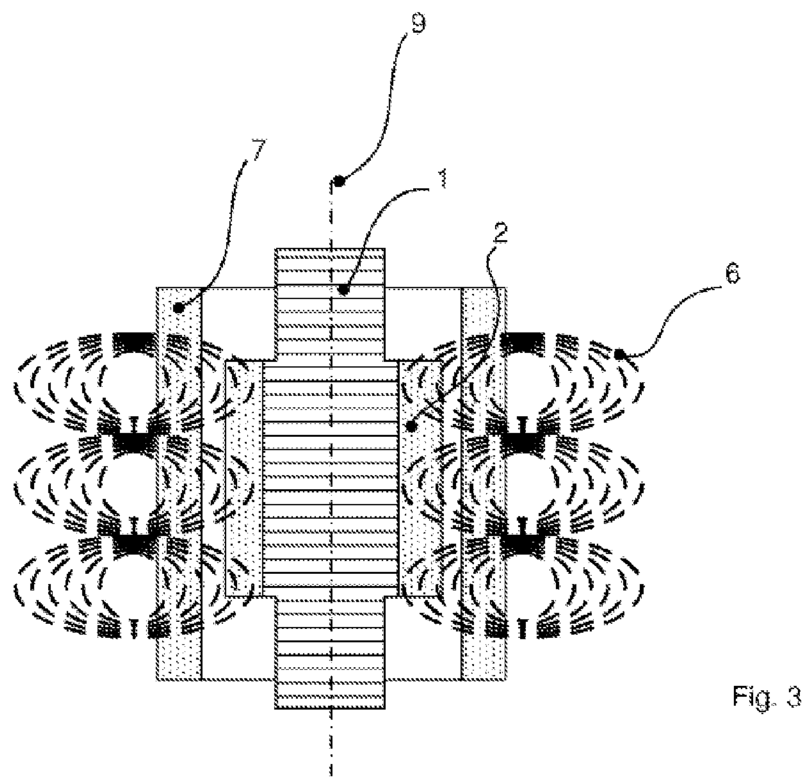
FIG. 3 shows a cross-sectional view of the bearing illustrated in FIGS. 1 and 2.

FIG. 3 shows one such end state of a completely assembled superconducting bearing.

Figure 4:
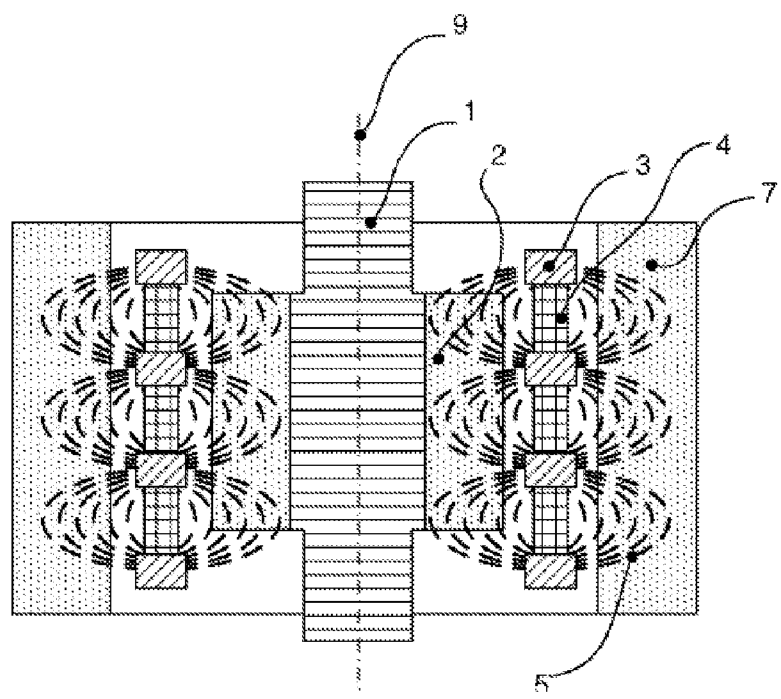
FIG. 4 shows a schematic cross-sectional view of a second step in a preferred implementation of the method of the invention, which has been modified in comparison with the diagram in FIG. 2; and, FIG. 5 shows a schematic cross-sectional view of a second step in a preferred implementation of the method of the invention, which has been modified further in comparison with the diagrams in FIGS. 2 and 4.
Figure 5:
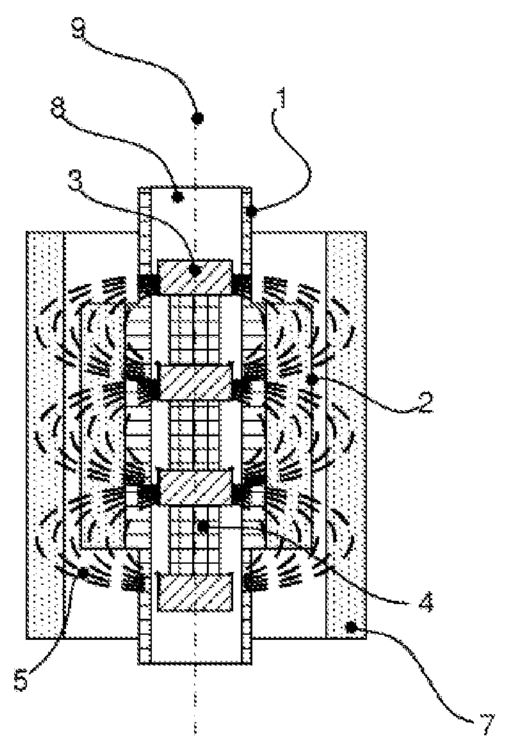

FIGS. 4 and 5 each show alternative implementations of the second step of the method, namely alternative possibilities for implementing the simultaneous application of external magnetic field 5 permeating both bodies 2, 7 to first body 2 and to second body 7. In the following description, the differences in comparison with the implementation explained in greater detail above with reference to FIG. 2, for example are to be pointed out, such that the same reference numerals denote features that are the same or features that are comparable in their technical effect.

In the step of implementing the method explained above, for example with reference to FIG. 2, the magnetizing device, for example coil 4, was arranged to surround both bearing rings 1.

FIG. 4 shows an implementation of the step of simultaneously applying external magnetic field 5 permeating both bodies 2, 7 to first body 2 and to second body 7, such that external magnetic field 5 is supplied by a magnetizing device, and the magnetizing device, for example the coil 4, is introduced between bearing rings 1 together with flux-conducting components 3. The external magnetic field is essentially located at the center radially between bodies 2, 7, so that a course of the field lines of external magnetic field 5 running essentially in mirror symmetry is applied. For example, external magnetic field 5 is limited to the area between two bodies 2, 7, so that no essential magnetic field escapes into the area outside of the second bearing ring on the outside radially.

In a further differentiation in comparison with the exemplary implementation of the method described above with reference to FIG. 2, bodies 2, 7 in the implementation depicted in FIG. 4 were first cooled below the transition temperature of the respective type-2 superconductor before external magnetic field 5 was supplied, i.e., before coil 4 was energized. Coil 4 is therefore operated with a pulsed current. In an alternative implementation in comparison with the implementation already described, it is possible to provide for at least one of two bodies 2, 7 to be kept in a normally conducting state and then to energize the coil with a direct current, for example, and then to convert at least one of bodies 2, 7 to the superconducting state.

FIG. 5 shows an implementation of the step of the simultaneous application of external magnetic field 5 permeating both bodies 2, 7 to first body 2 and to second body 7, as an alternative to the representations from FIGS. 2 and 4. External magnetic field 5 is supplied by a magnetizing device having coil 4 and flux-conducting components 3. The magnetizing device, for example coil 4, has been applied through hollow shaft 8 arranged in the bearing, such that hollow shaft 8 is accommodated in first bearing ring 1.

On energization of coil 4, external magnetic field 5 passes through hollow shaft 8 and permeates two bodies 2, 7 at the same time. After bodies 2, 7 have been cooled to a temperature below the transition temperature of the respective type-2 superconductor, external magnetic field 5 is fixed as applied magnetic field 6 in bodies 2, 7 and is permanent. It is self-evident here that for applying external magnetic field 5, it is also possible to provide for bodies 2, 7 to first be cooled to a temperature below the transition temperature of the respective type-2 superconductor and then to supply external magnetic field 5 of the magnetizing device.

In the three exemplary implementations of the method described above, the energization of coil 4 of the magnetizing device was provided as the only sub-step in the simultaneous application of external magnetic field 5 passing through both bodies 2, 7 to first body 2 and to second body 7. It is self-evident that a chronological sequence of multiple external magnetic fields 5 may be provided to develop magnetic field 6 applied to body 2, 7. The possibilities described above with regard to FIG. 2, FIG. 4 and FIG. 5, for example, may be combined.

In the exemplary embodiments described above, coil 4 of the magnetizing device was energized with a direct current. It is self-evident that coil 4 of the magnetizing device may be energized not only by a direct current but also by a current that varies over time, for example in pulsed operation, to form applied magnetic field 6.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS

1 first bearing ring
2 first body
3 flux-conducting component
4 coil
5 magnetic field
6 applied magnetic field
7 second body
8 borehole
9 axis of rotation

The invention claimed is:

1. A method of assembling a superconducting bearing, comprising:

connecting a first body made of a type-2 superconducting material to a first bearing ring;

disposing a second bearing ring comprising a second body made of a type-2 superconducting material radially outward of the first body such that every first line, orthogonal to an axis of rotation for the superconducting bearing, passing through the first body also passes through the second bearing ring;

placing an external magnetizing device between the first body and the second bearing ring such that a second line, orthogonal to the axis of rotation, passes through, in sequence, the second bearing ring, the external magnetizing device, the first body, the first bearing ring, the first body, the external magnetizing device, and the second bearing ring; and, applying, using the external magnetizing device, an external magnetic field, which permeates the first and second bodies.

2. The method as recited in claim 1, further comprising:

displacing the external magnetizing device in a direction parallel to the axis of rotation so that no second line, orthogonal to the axis of rotation, passes through the superconducting bearing and the external magnetizing device.

3. A method of assembling a superconducting bearing, comprising:

connecting a first body made of a type-2 superconducting material to a first bearing ring;

disposing a second bearing ring comprising a second body made of a type-2 superconducting material radially outward of the first body such that every first line, orthogonal to an axis of rotation for the superconducting bearing, passing through the first body also passes through the second bearing ring;

placing an external magnetizing device within a hollow shaft in the first bearing ring such that a second line orthogonal to the axis of rotation passes through, in sequence, the external magnetizing device, the first bearing ring, the first body, a gap, and the second bearing ring; and, applying, using the external magnetizing device, an external magnetic field, which permeates the first and second bodies.

4. The method as recited in claim 3, further comprising:

displacing the external magnetizing device in a direction parallel to the axis of rotation so that no third line, orthogonal to the axis of rotation, passes through the superconducting bearing and the external magnetizing device.

* * * * *